Sept. 18, 1945. J. R. TEDD 2,385,170
STEERING SPINDLE BEARING FOR AUTOMOBILES
Filed March 4, 1944

INVENTOR
J.R.TEDD
By CBBirkenbeuel
ATTORNEY

Patented Sept. 18, 1945

2,385,170

UNITED STATES PATENT OFFICE 2,385,170

STEERING SPINDLE BEARING FOR AUTOMOBILES

James R. Tedd, Willamette, Oreg.

Application March 4, 1944, Serial No. 524,995

2 Claims. (Cl. 280—96.1)

This invention relates generally to the automotive art and particularly to a steering spindle bearing.

The main object of this invention is to construct a steering spindle bearing which will automatically take up the wear occasioned by the severe shocks imposed on that bearing by reason of its duty.

The second object is to produce an inexpensive spindle bearing which can be easily replaced and which will eliminate all of the looseness commonly encountered in the steering wheel mountings.

I accomplish these results in a manner set forth in the following specification as illustrated in the accompanying drawing, in which.

Figures 1, 2:
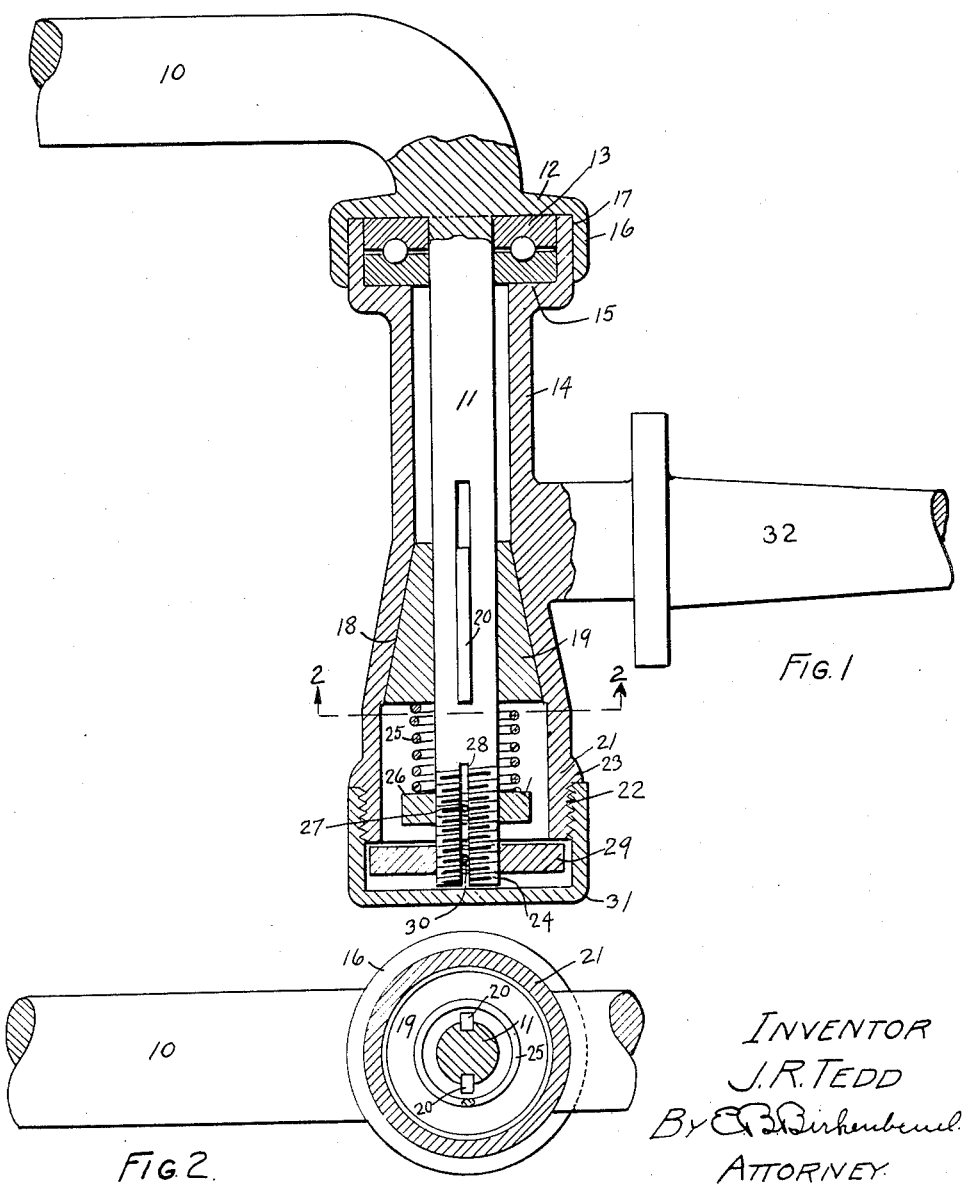
Fig. 1 is a vertical section through the device.
Fig. 2 is a transverse section taken along the line 2—2 in Fig. 1.

Referring in detail to the drawing, there is shown a portion of a front axle 10, from which there projects downwardly the vertical steering spindle 11. A hood 12 is formed at the junction of the spindle 11 and axle 10 and contains the anti-friction bearing 13 which may be either a separate unit or be made integral with the parts of the device. The hood 12 rests on the top side of the bearing 13. Surrounding the steering spindle 11 is a steering spindle sleeve 14, whose upper end 15 receives the bearing 13 and is shouldered to bear against the under side of the bearing 13.

The sides 16 of the hood 12 extend downwardly outside of the side 17 of the upper end 15, and serve to protect the bearing from dirt and water. The intermediate portion 18 of the sleeve 14 is conical in shape and is finished to rotatably receive the bearing bushing 19, which is slidably mounted on the spindle 11 and held against rotation with relation thereto by means of the splines 20. The lowermost end 21 of the spindle sleeve 14 is cylindrical in form and is provided with external thread 22 and shoulder 23. The spindle 11 is provided with a threaded end 24 on its lower end. A spring 25 is placed around the spindle 11 below the bushing 19. A compression adjusting nut 26 is mounted on the threaded end 24 on the under side of the spring 25 and is held against rotation by means of the cotter pin 27 which passes through a slot 28 through the spindle 11. A circular nut 29 is threaded on the lower end of the threaded portion 24 and is held against rotation by means of the pin 30. The cap 31 is internally threaded to receive the threads 22 of the sleeve 14 and protects the lower end of the bearing against water and dirt. The front wheel spindle is illustrated as being integral with the sleeve 14. The operation of the device is as follows:

When the device is assembled, the nut 26 is turned until there is sufficient compression on the spring 25 to take up all objectionable clearance between the members 18 and 19. The cotter pin 27 is then put in place, after which the nut 29 is turned to a position in which it almost touches the lower end 21. It will be seen that in actual use the anti-friction bearing 13 takes care of the movement at the upper end of the spindle 11, while the lower end of the spindle 11 which receives the major portion of the road shocks is perfectly supported by the bearing 19 which, as stated, is in a form of a conical bushing, preferably of a high grade bronze. The compression on the spring 25 should be sufficient to insure a snug fit without binding.

If the spindle is subjected to a severe rebound or the car is jacked up, then the weight of the wheel is downwardly against the spring 25. To prevent any objectionable chatter or separation of the bearing parts, the nut 29 is provided which permits only a limited separation of the members.

While I have thus illustrated and described my invention, it is not my desire to limit myself to the precise forms shown herein, but I do intend to cover all such forms and modifications thereof as fall fairly within the appended claims.

I claim:

1. A steering spindle for automobiles having an anti-friction bearing at its upper end and a bronze bearing at its lower end, said bronze bearing being slidably and non-rotatably mounted on said spindle, said bearing having a conical exterior with its larger end lowermost, a sleeve disposed around said spindle having its upper end supporting said anti-friction bearing and having its lower end supported by said bronze bearing, and a nut on the lower end of said spindle normally out of engagement with the lower end of said sleeve, adapted to prevent the separation of the supported parts from their bearings.

2. A steering spindle for automobiles having an anti-friction bearing at its upper end and a bronze bearing at its lower end, said bronze bearing being slidably and non-rotatably mounted on said spindle, said bearing having a conical exterior with its larger end lowermost, a sleeve disposed around said spindle having its upper end supporting said anti-friction bearing and having its lower end supported by said bronze bearing, a spring for urging said bronze bearing toward said friction bearing, and a nut on the lower end of said spindle normally out of engagement with the lower end of said sleeve, adapted to prevent the separation of the supported parts from their bearings.

JAMES R. TEDD.